United States Patent [19]
Welsh et al.

[11] Patent Number: 6,032,551
[45] Date of Patent: *Mar. 7, 2000

[54] BALANCE WEIGHT AND METHOD OF SECURING SAME TO A ROTATABLE TUBULAR BODY

[75] Inventors: David E. Welsh; Oliver Lee Sims, both of Toledo, Ohio

[73] Assignee: Dana Corporation, Toledo, Ohio

[ * ] Notice: This patent is subject to a terminal disclaimer.

[21] Appl. No.: 08/463,399

[22] Filed: Jun. 5, 1995

Related U.S. Application Data

[62] Division of application No. 08/185,756, Jan. 24, 1994, Pat. No. 5,778,737, which is a continuation of application No. 07/643,170, Jan. 22, 1991, abandoned, which is a continuation of application No. 06/804,339, Dec. 5, 1985, abandoned, which is a continuation of application No. 06/537,113, Sep. 23, 1983, abandoned.

[51] Int. Cl.$^7$ ............... F16F 15/22; B23P 6/00
[52] U.S. Cl. ............ 74/573 R; 74/572; 464/180; 29/402.07
[58] Field of Search ............ 74/572–574; 464/180, 464/179, 182; 73/66, 468; 29/402.07

[56] References Cited

U.S. PATENT DOCUMENTS

| | | |
|---|---|---|
| 1,497,735 | 6/1924 | Richardson . |
| 1,645,343 | 10/1927 | Moorhouse . |
| 1,770,852 | 7/1930 | Hill . |
| 2,206,472 | 7/1940 | Taylor . |
| 2,334,285 | 11/1943 | Philippi . |

(List continued on next page.)

FOREIGN PATENT DOCUMENTS

| | | |
|---|---|---|
| 719582 | of 1942 | Germany . |
| 3035437 | 5/1982 | Germany . |
| 139044 | of 1981 | Japan . |
| 58-124846 | 7/1983 | Japan . |
| 0624130 | of 1978 | Russian Federation . |
| 2041159 | 9/1980 | United Kingdom . |
| 2147388 | 5/1985 | United Kingdom . |

OTHER PUBLICATIONS

Chapter 8, "Welding ALCOA Aluminum", published by the Aluminum Company of America, Pittsburg, Pennsylvania (undated).
Chapter 5, "The Universal Joint Specialist", copyrighted 1982 by the Dana Corporation, Toledo, Ohio.
Chapter 8, "Universal Joint and Driveshaft Manual", published in SAE Bulletin AE–7, 1979.
Metals and Alloys—Miscellaneous Properties.
Modern Welding Technology, Howard B. Cary, Prentice–Hall, Inc.; Feb. 13, 1980, p. 501–516 and 517.
Translation of German Patent Application Publication No. DE 1,035,437 A1 Pub. date May 6, 1982; PTO 88–0631.

*Primary Examiner*—Vinh T. Luong
*Attorney, Agent, or Firm*—MacMillan, Sobanski & Todd, LLC

[57] ABSTRACT

An improved balance weight construction and a method of securing such a balance weight to a drive shaft or other tubular body are disclosed. A generally cylindrical balance weight is formed with a curved end surface which conforms to the outer surface of the drive shaft. The balance weight and drive shaft are typically formed of dissimilar materials, such as steel and aluminum, respectively. The balance weight has a coaxial aperture formed therethrough and a plurality of radially-extending grooves formed in the curved surface thereof which connect the aperture with the edge of the surface. While the balance weight is maintained against the drive shaft at a predetermined location satisfactory for balancing the drive shaft, an adhesive material, such as molten aluminum wire, is supplied within the aperture so as to form a spot or rivet-type weld. The radially-extending grooves provide passages which allow gases within the aperture to escape, thereby promoting the smooth flow of molten aluminum into the aperture and increasing the reliability of the weld.

18 Claims, 1 Drawing Sheet

U.S. PATENT DOCUMENTS

| | | |
|---|---|---|
| 2,722,848 | 11/1955 | Stein . |
| 2,993,386 | 7/1961 | McClendon . |
| 3,097,537 | 7/1963 | Peterson . |
| 3,156,504 | 11/1964 | Antraigue . |
| 3,273,419 | 9/1966 | Kollmann et al. . |
| 3,310,388 | 3/1967 | Bennett et al. . |
| 3,365,382 | 1/1968 | McCrosky et al. . |
| 3,506,478 | 4/1970 | Hudson et al. . |
| 3,512,022 | 5/1970 | Gilbert . |
| 3,528,316 | 9/1970 | Hammer . |
| 3,682,017 | 8/1972 | Mayer . |
| 3,736,811 | 6/1973 | Neary . |
| 3,783,522 | 1/1974 | Dodd ................................ 73/462 X |
| 3,812,724 | 5/1974 | Curtz et al. . |
| 3,939,020 | 2/1976 | Caramanian et al. . |
| 4,027,549 | 6/1977 | Colletti . |
| 4,161,683 | 7/1979 | Stroud et al. ......................... 322/87 |
| 4,170,896 | 10/1979 | Korkosz ................................ 73/66 |
| 4,178,811 | 12/1979 | Shepherd . |
| 4,241,620 | 12/1980 | Pichl et al. . |
| 4,300,803 | 11/1981 | Chordsevic . |
| 4,356,083 | 10/1982 | Romanauskas . |
| 4,409,466 | 10/1983 | Commeau . |
| 4,425,299 | 1/1984 | Koiso . |
| 4,684,281 | 8/1987 | Patterson .............................. 403/197 |
| 4,887,989 | 12/1989 | Kerecman . |
| 4,895,551 | 1/1990 | Fritz ................................... 464/180 |
| 5,469,931 | 11/1995 | Kawata et al. ....................... 464/182 X |

BALANCE WEIGHT AND METHOD OF SECURING SAME TO A ROTATABLE TUBULAR BODY

CROSS REFERENCE TO RELATED APPLICATIONS

This application is a division of Ser. No. 08/185,756, filed Jan. 24, 1994, now U.S. Pat. No. 5,778,737 issued on Jul. 4, 1998 which is a continuation of Ser. No. 07/643,170, filed Jan. 22, 1991, now abandoned, which was a continuation of Ser. No. 06/804,339, filed Dec. 5, 1985, now abandoned, which was a continuation of Ser. No. 06/537,113, filed Sep. 23, 1983, now abandoned.

BACKGROUND OF THE INVENTION

1. Field of the Invention

The present invention relates in general to the balancing of rotatable mechanical components and in particular to a balance weight construction and a method for securing one or more of such balance weights to a rotatable component of a vehicular drive train.

It is generally conceded that drive shafts are among the most troublesome components in modern vehicles, primarily because of their tendency to produce and transmit noise or vibration while transferring the power of the engine to the rear axle. This problem is becoming increasingly more serious because automobile manufacturers and consumers are demanding quieter and smoother cars with each succeeding model. The problem is further increased by the greater use of unitary automobile bodies, which bodies tend to accentuate noise and vibration.

Within recent years, there has been a noticeable increase in the problems of drive shaft balance and straightness on repaired or rebuilt shafts. These problems range from economy models to the more expensive cars, and in both single and compound drive shafts. Furthermore, as the gauge of the metal utilized in automobile bodies and frames is decreased and the weight of the engine, transmission, and differential becomes less, the problems associated with drive shaft imbalance become more critical.

2. Description of the Prior Art

Chapter Eight of the "Welding ALCOA Aluminum" booklet, published by the Aluminum Company of America of Pittsburgh, Pa. (undated), discloses the method of welding dissimilar materials utilizing the MIG-spot welding process. The details of the process are set forth on pages 93 through 95 therein. In particular, it is disclosed that an opening in one of the parts to be welded can provide a path for the molten filler metal wire.

Section 5 of "The Universal Joint Specialist" catalog, copyrighted in 1962 by Dana Corporation, generally discusses propeller shaft installation and replacement tips relating to propeller shaft balance. In particular, it is disclosed at page 72 therein that the correction of drive shaft imbalance can be accomplished with balancing weights or slugs which are added to the "light" side of the drive shaft. Although spot welding is desirable because it is a "cold" weld, arc or electric welding can be utilized successfully by tacking the weight or slug in two places to the shaft.

Chapter Eight of the "Universal Joint and Drive Shaft Design Manual", published in SAE Bulletin AE-7 in 1979, generally discusses the problems associated with the balancing of rotating bodies. In particular, it is disclosed at page 218 therein that the imbalance correction of vehicle drive shafts can be accomplished by projection welding suitably sized steel weights to the shaft at the proper angular locations in the correction planes.

SUMMARY OF THE INVENTION

An improved balance weight construction and a method of securing such a balance weight to a drive shaft or other tubular body are disclosed. A generally cylindrical balance weight is formed with a curved surface at one end which conforms to the outer diameter of the drive shaft. The balance weight and drive shaft are typically formed of dissimilar materials, such as steel and aluminum, respectively. The balance weight has a coaxial aperture formed therethrough and a plurality of radially-extending grooves formed in the face on the curved end thereof.

While the balance weight is maintained against the drive shaft at a predetermined location for balancing the drive shaft, an adhesive material, such as molten aluminum wire, is supplied within the aperture so as to form a spot or rivet-type weld. The radially-extending grooves provide passages which allow gases within the aperture to escape as the adhesive material enters, thereby promoting the smooth flow of molten aluminum into the aperture and increasing the reliability of the weld.

It is an object of the present invention to provide an improved method for securing a balance weight to a drive shaft or other tubular component.

It is a further object of the present invention to provide a simple and inexpensive balance weight for and a method of balancing a rotating tubular body.

Other objects and advantages of the present invention will become apparent to those skilled in the art of the following detailed description of the preferred embodiment, when read in light of the accompanying drawings.

DETAILED DESCRIPTION OF THE PREFERRED EMBODIMENT

Figure 1:
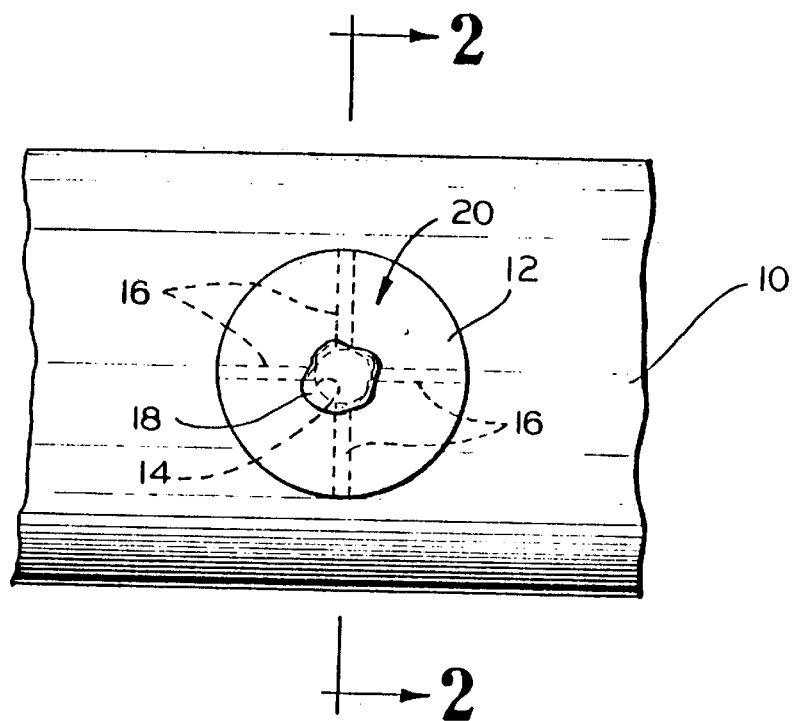
FIG. 1 is a top plan view of a portion of a drive shaft having a balance weight secured thereto in accordance with the present invention.
Figure 2:
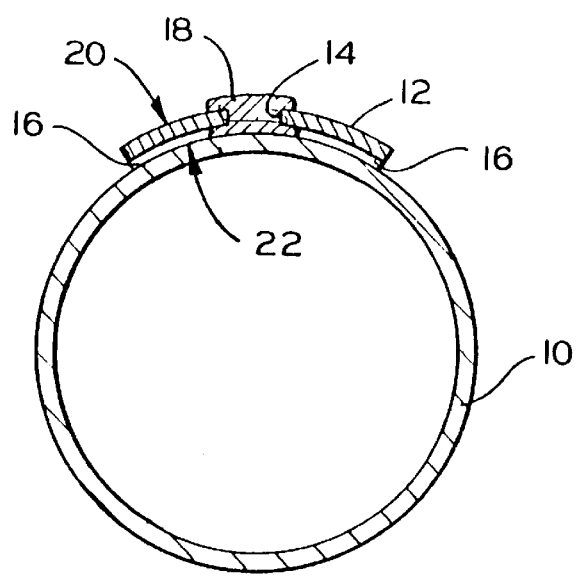
FIG. 2 is a sectional elevational view taken along line 2—2 of FIG. 1.

Referring now to the drawings, there is illustrated in FIGS. 1 and 2 a tubular body, such as a vehicular drive shaft 10, having a balance weight 12 secured thereto in accordance with the present invention. It has been found desirable to form the balance weight 12 from a material which is different than that of the drive shaft 10. Typically, the drive shaft 10 is formed of aluminum, while the balance weight 12 is formed of a dissimilar material, such as steel or any other relatively high density material. As illustrated most clearly in FIG. 2, the balance weight 12 has a generally cylindrical body which is curved with respect to a plane perpendicular to the longitudinal axis of the body such that the end surface facing the drive shaft generally conforms to the outer diameter of the drive shaft 10.

The balance weight 12 is formed with a coaxial aperture 14 extending therethrough. It has been found desirable to form the aperture 14 approximately 0.375 inches in diameter, although this dimension may be varied in accordance with the size of the balance weight 12. Then, one or more radially-extending grooves 16 are formed in the end surface of the balance weight 12 which will abut the outer surface of the drive shaft. The grooves 16 can be formed of any convenient width, so long as the passage of gas therethrough is not inhibited. Similarly, the number of such passages 16, as well as the particular orientation thereof on the balance weight 12, is not critical so long as the flow of gas is not restricted.

Once the balance weight 12 has been properly formed, it is maintained against the outer surface of the drive shaft 10 at a location which has previously been determined to be satisfactory for balancing the drive shaft 10 for rotation. The balance weight 12 can be temporarily maintained in such position by any convenient means. An adhesive material, such as molten aluminum wire 18, is supplied to the interior of the aperture 14. The molten aluminum 18 can be supplied by a conventional arc welding apparatus adapted to form spot welds. The aperture 14 forms a mold for the molten aluminum 18 above the outer surface of the drive shaft 10. The molten aluminum 18 can be applied such that a small amount of the material overflows the volume of the aperture 14 so as to form a "cap" thereover. The molten aluminum 18 adheres readily to the outer surface of the aluminum drive shaft 10. In this manner, a secure spot or rivet-type weld is formed which will maintain the balance weight 12 against the drive shaft 10.

The balance weight 12 has been shown in the form of a cylindrical body which has been shaped such that its end surfaces 20 and 22 on its second end and on its first end, respectively, are curved to parallel or conform to the outer surface of the drive shaft 10. However, only the first end surface 22 abutting the drive shaft needs to be so shaped. Furthermore, more than one of the apertures 14 can be used to secure the weight to the drive shaft.

In accordance with the provisions of the patent statutes, the principle and mode of operation of the present invention have been explained and illustrated in its preferred embodiment. However, it must be appreciated that the present invention can be practiced otherwise than as specifically explained and illustrated without departing from the spirit or scope.

What is claimed is:

1. A method of manufacturing an aluminum drive shaft which is balanced for rotation about an axis comprising the steps of:
   (a) providing an aluminum drive shaft which is unbalanced for rotation about the axis, the aluminum drive shaft including a surface;
   (b) providing a balance weight including a body formed from a material having a higher density than that of aluminum and having an aperture formed therethrough extending from a first end to a second end;
   (c) disposing the first end of the balance weight on the surface of the aluminum drive shaft at a location for balancing the aluminum drive shaft for rotation about the axis; and
   (d) retaining the balance weight on the surface of the aluminum drive shaft by providing aluminum welding material welded only to the surface of the aluminum drive shaft and extending from the first end of the body through the aperture to the second end, the welding material extending over, but not welded to, a portion of the second end of the body to form a cap thereover so as to retain the body on the surface of the aluminum drive shaft.

2. The method defined in claim 1 wherein said step (b) is performed by providing the body having a shape which is generally circular.

3. The method defined in claim 2 wherein said step (b) is performed by providing the aperture co-axially through the body.

4. The method defined in claim 1 wherein said step (b) includes the further step of providing at least one groove formed in the first end of the body of the balance weight which extends from the aperture to an edge of the first end.

5. The method defined in claim 1 wherein said step (b) includes the further step of providing a plurality of grooves formed in the first end of the body of the balance weight and which extend from the aperture to an edge of the first end.

6. The method defined in claim 1 wherein said step (b) is performed by providing the body formed from steel.

7. A method of manufacturing an aluminum drive shaft which is balanced for rotation about an axis comprising the steps of:
   (a) providing an aluminum drive shaft which is unbalanced for rotation about the axis, the aluminum drive shaft including a surface;
   (b) providing a balance weight including a body formed from a material having a higher density than that of aluminum and having an aperture formed therethrough extending from a first end to a second end;
   (c) disposing the first end of the balance weight on the surface of the aluminum drive shaft at a location for balancing the aluminum drive shaft for rotation about the axis; and
   (d) retaining the balance weight on the surface of the aluminum drive shaft by providing aluminum welding material welded only to the surface of the aluminum drive shaft and extending from the first end of the body through the aperture to the second end, the welding material extending over a portion of the second end of the body to form a cap thereover so as to retain the body on the surface of said aluminum drive shaft, the cap providing the sole means for retaining the balance weight upon the aluminum drive shaft.

8. The method defined in claim 7 wherein said step (b) is performed by providing the body having a shape which is generally circular.

9. The method defined in claim 8 wherein said step (b) is performed by providing the aperture co-axially through the body.

10. The method defined in claim 7 wherein said step (b) includes the further step of providing at least one groove formed in the first end of the body of the balance weight which extends from the aperture to an edge of the first end.

11. The method defined in claim 7 wherein said step (b) includes the further step of providing a plurality of grooves formed in the first end of the body of the balance weight and which extend from the aperture to an edge of the first end.

12. The method defined in claim 7 wherein said step (b) is performed by providing the body formed from steel.

13. A method of manufacturing an aluminum drive shaft which is balanced for rotation about an axis comprising the steps of:
   (a) providing an aluminum drive shaft which is unbalanced for rotation about the axis, the aluminum drive shaft including a surface;
   (b) providing a balance weight including a body formed from a material having a higher density than that of aluminum and having an aperture formed therethrough extending from a first end to a second end;
   (c) disposing the first end of the balance weight on the surface of the drive shaft at a location for balancing the aluminum drive shaft for rotation about the axis; and
   (d) retaining the balance weight on the surface of the aluminum drive shaft by providing aluminum welding material welded only to the surface of the aluminum drive shaft and extending from the first end of the body through the aperture without substantial deformation thereof to the second end, the welding material extending over a portion of the second end of the body without substantial deformation thereof to form a cap thereover so as to retain the body on the surface of the aluminum drive shaft.

14. The method defined in claim 13 wherein said step (b) is performed by providing the body having a shape which is generally circular.

15. The method defined in claim 14 wherein said step (b) is performed by providing the aperture co-axially through the body.

16. The method defined in claim 13 wherein said step (b) includes the further step of providing at least one groove formed in the first end of the body of the balance weight which extends from the aperture to an edge of the first end.

17. The method defined in claim 13 wherein said step (b) includes the further step of providing a plurality of grooves formed in the first end of the body of the balance weight and which extend from the aperture to an edge of the first end.

18. The method defined in claim 13 wherein said step (b) is performed by providing the body formed from steel.

* * * * *